United States Patent [19]

Leung et al.

[11] Patent Number: 5,103,444
[45] Date of Patent: Apr. 7, 1992

[54] CONFERENCE CONNECTION METHOD IN A MULTICAST PACKET SWITCHING NETWORK

[75] Inventors: Wu-Hon F. Leung, Downers Grove; Shi-Chuan Tu, Lisle, both of Ill.

[73] Assignee: AT&T Bell Laboratories, Murray Hill, N.J.

[21] Appl. No.: 508,866

[22] Filed: Apr. 12, 1990

[51] Int. Cl.$^5$ ............................................. H04Q 11/04
[52] U.S. Cl. ....................................... 370/60; 370/94.1
[58] Field of Search ......................... 370/94.1, 60, 85.1

[56] References Cited

U.S. PATENT DOCUMENTS

| | | | |
|---|---|---|---|
| 4,740,954 | 4/1988 | Cotton et al. | 370/60 |
| 4,745,593 | 5/1988 | Stewart | 370/60 |
| 4,864,559 | 9/1989 | Perlman | 370/60 |
| 4,887,259 | 12/1989 | Morita | 370/60 |
| 4,894,822 | 1/1990 | Buhrke et al. | 370/60 |
| 4,901,309 | 2/1990 | Turner | 370/60 |
| 4,905,231 | 2/1990 | Leung et al. | 370/94.1 |
| 4,991,171 | 2/1991 | Teraslinna et al. | 370/94.1 |

OTHER PUBLICATIONS

J. J. Degan et al., "Fast Packet Technology for Future Switches", *AT&T Technical Journal*, vol. 68, No. 2, Mar./Apr. 1989, pp. 36-50.
S. Nojima et al., "High Speed Packet Switching Network for Multi-Media Information", *Proceedings of IEEE 1986 Computer Networking Symposium*, pp. 141-150.
K. Yukimatsu et al., "Multicast Communication Facilities in a High Speed Packet Switching Network", *Proceedings of ICCC'86*, pp. 276-281.
E. Arthurs et al., "The Architecture of a Multicast Broadband Packet Switch", *Proceedings of IEEE INFOCOM'88*, pp. 1-8.
K. Y. Eng et al., "Multicast and Broadcast Services in a Knockout Packet Switch", *Proceedings of IEEE INFOCOM'88*, pp. 29-34.
J. S. Turner, "Design of a Broadcast Packet Switching Network", *IEEE Trans. on Communications*, vol. 36, No. 6, 1988, pp. 734-743.
W. H. Leung et al., "A Set of Operating System Mechanisms to Support Multi-Media Applications", *Proceedings of 1988 International Zurich Seminar on Digital Communications*, Mar. 1988, pp. B4.1-B4.6.
A. Ghafoor et al., "An Efficient Communication Structure for Distributed Commit Protocols", *IEEE Journal on Selected Areas in Communications*, vol. 7, No. 3, Apr. 1989, pp. 375-389.
S. E. Minzer et al., "New Directions in Signaling for Broadband ISDN", *IEEE Communications Magazine*, Feb. 1989, pp. 6-14.
L. Aguilar et al., "Architecture for a Multimedia Teleconferencing System", *Proceedings ACM SIGCOM'86 Symposium*, Aug., 1986, pp. 126-136.
S. R. Ahuja et al., "The Rapport Multimedia Conferencing System", *Proceedings of Conference on Office Information Systems*, Mar. 1988, pp. 1-8.
H. Forsdick, "Explorations into Real-Time Multimedia Conferencing", *Proceedings of the 2nd International Symposium on Computer Message Systems*, IFIP, Sep., 1985, pp. 331-347.
K. A. Lantz, "An Experiment in Integrated Multimedia Conferencing", *Proceedings of the Conference on Computer-Supported Cooperative Work'86*, Dec. 1986, pp. 533-552.
A. Poggio et al., "CCWS: A Computer-Based, Multimedia Information System", *Computer*, Oct. 1985, pp. 92-103.

*Primary Examiner*—Douglas W. Olms
*Assistant Examiner*—Dang Ton
*Attorney, Agent, or Firm*—R. T. Watland; M. B. Johannesen

[57] ABSTRACT

A conference connection method for use in a multicast packet switching network. Once the packet switches and inter-switch links to comprise a multicast connection among three or more endpoints are determined, a check is performed to determine whether that multicast connection would to usable to effect communication in accordance with a specified transmission matrix and meeting a packet sequencing condition. The multicast connection is established only when the check indicates that the connection would meet both requirements.

13 Claims, 7 Drawing Sheets

|   | A | B | C | D |
|---|---|---|---|---|
| A | 0 | 1 | 1 | 1 |
| B | 1 | 0 | 1 | 0 |
| C | 1 | 1 | 0 | 0 |
| D | 1 | 0 | 0 | 0 |

TRANSMISSION MATRIX
DEFINING CONNECTIVITY
AMONG END POINTS A,B,C,D

|   | A | B | C | D |
|---|---|---|---|---|
| A | 0 | 0 | 1 | 1 |
| B | 0 | 0 | 1 | 1 |
| C | 0 | 0 | 0 | 0 |
| D | 0 | 0 | 0 | 0 |

|   | A | B | C | D |
|---|---|---|---|---|
| A | 0 | 0 | 1 | 1 |
| B | 0 | 0 | 1 | 1 |
| C | 0 | 0 | 0 | 0 |
| D | 0 | 0 | 0 | 0 |

|   | A | B | C | D |
|---|---|---|---|---|
| A | 0 | 1 | 1 | 1 |
| B | 1 | 0 | 0 | 0 |
| C | 1 | 0 | 0 | 0 |
| D | 0 | 0 | 0 | 0 |

|   | A | B | C | D |
|---|---|---|---|---|
| A | 0 | 1 | 1 | 1 |
| B | 1 | 0 | 0 | 0 |
| C | 0 | 0 | 0 | 0 |
| D | 0 | 0 | 0 | 0 |

CONFERENCE CONNECTION METHOD IN A MULTICAST PACKET SWITCHING NETWORK

CROSS-REFERENCE TO RELATED APPLICATIONS

This application is related to the application of T. J. Baumgartner, Y. H. Hwang, E. H. Jones, W. F. Leung, L. F. Morgan, and S. Tu Case 1-1-1-8-1-3 entitled "Multiple Call Control Method in a Multimedia Conferencing System", and T. J. Baumgartner and W. F. Leung Case 2-10 entitled "Transformation Method for Network Conference Connections" filed concurrently herewith and assigned to the same assignee as the present application.

TECHNICAL FIELD

This invention relates to packet communication.

BACKGROUND AND PROBLEM

In local area networks where users share a common communication medium, broadcasting or multicasting to transmit the same information to all or a specified set of users is straightforward. Such capabilities are typically not available in existing wide area packet switching networks. As network bandwidths increase significantly, multicast applications including simulcast (voice/video one-way broadcast), multi-destination file transfer, distributed database update, and various kinds of multimedia, multi-party teleconferences will become more widespread. To implement multicasting in conventional point-to-point packet switching networks, packet duplication is done in the software session layer. This is inefficient due to the large processing overhead required to duplicate packets at packet source stations and to transmit each of the duplicated packets individually through the network. Uneven end-to-end transmission delays that are likely in such an arrangement are unacceptable for interactive multi-party teleconferences. In addition, performance degrades rapidly as the number of participants increases.

Multicast applications can be provided more efficiently in hardware via high-speed networks of multicast packet switches. A multicast packet switch is capable of duplicating an incoming packet and routing the copies to desired output ports simultaneously. It is not necessary to transmit duplicate packets from end to end through a network of such switches. Rather only a single packet is transmitted on any inter-switch link and duplication is required only for transmission to destinations via different links. A multicast connection is established among a plurality of communication endpoints, e.g., user stations or network interfaces to such stations, by transmitting a call setup packet through the network. Along the way, logical channel numbers are assigned and network memories are updated such that future packets need not include full destination information.

The desired sending/receiving relationship among the endpoints involved in a conference multicast connection may be represented by a transmission matrix. As multicast applications become more diverse, it is anticipated that multicast connections will be required to provide a wide range of connectivity among user stations. Such connectivity may be highly selective. For example, in a conference involving four participants A, B, C, and D, A may be allowed to transmit to B, C, and D, while B is allowed to transmit to A and C only, C to A and B only, and D to A only. The transmission matrix for this example is shown in FIG. 1c. It may also be necessary, particularly in voice or video applications, to make sure that packets are delivered by the network in the proper sequence.

Accordingly, two significant requirements in conferencing applications are that: 1) a multicast connection must provide connectivity in accordance with a specified transmission matrix, and 2) the multicast connection must deliver packets to endpoints meeting a packet sequencing condition. Unfortunately, a multicast connection in an arbitrary network of multicast packet switches may, in general, fail to meet one or both of these requirements.

SOLUTION

This problem is solved and a technical advance is achieved in accordance with the principles of the invention in a method where once the packet switches and inter-switch links to comprise a multicast connection among three or more endpoints are determined, a check is performed to determine whether that multicast connection would be usable to effect communication in accordance with a specified transmission matrix and meeting a packet sequencing condition. Illustratively, the multicast connection is established only when the check indicates that the connection would meet both requirements.

A method in accordance with the invention is used in an arrangement comprising a multicast packet switching network for communication among a plurality of endpoints. The network is made up of a plurality of packet switches interconnected by a plurality of inter-switch links. Each of the endpoints is connected to one of the packet switches. A set of packet switches and a set of inter-switch links are determined to comprise a multicast connection through the network for communication among a set comprising at least three endpoints. The determined multicast connection is then checked as to whether it would be usable to effect communication among the set of endpoints in accordance with a specified transmission matrix and meeting a packet sequencing condition.

In an illustrative arrangement, each inter-switch link uses at most one logical channel number for the connection. The check of the multicast connection is performed by having the packet switches of the connection perform individual checks. The connection is a multicast virtual circuit to assure reliable packet transfer.

Two packet sequencing conditions are defined. A weak packet sequencing condition guarantees point-to-point sequential packet transfer. A strong packet sequencing condition guarantees that those endpoints receiving packets from at least two common sending endpoints will receive identical interleaved packet streams with respect to the packet streams from the common sending endpoints.

Figure 1A:
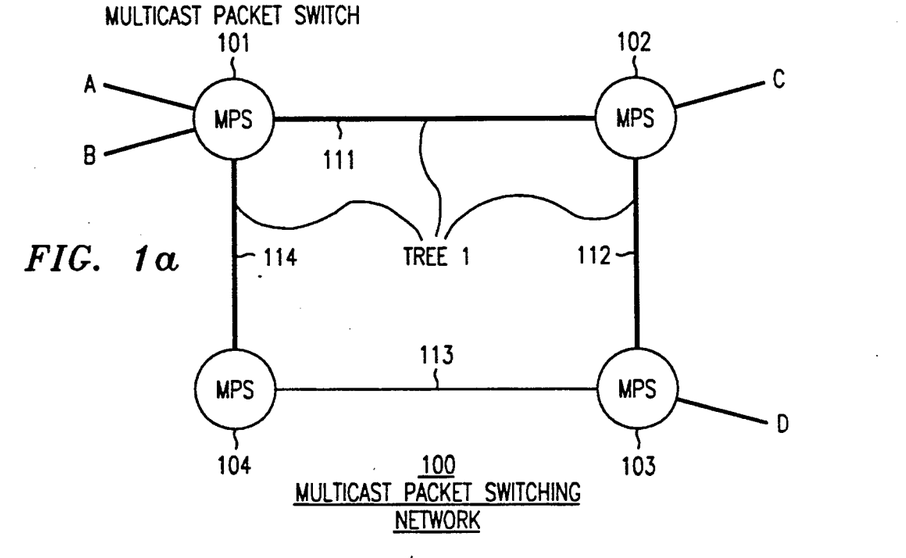
FIG. 1a-FIG. 1c are diagrams used in describing an exemplary method of the invention when a weak packet sequencing condition is required.

FIG. 1a is a diagram of an arrangement using an exemplary connection method in accordance with the invention. The arrangement comprises a multicast packet switching network 100 for communication among a plurality of communication endpoints A, B, C, and D, representing, for example, user stations or network interfaces. Network 100 comprises four multicast packet switches 101, 102, 103, 104, each capable of duplicating an incoming packet and routing the copies to desired output ports simultaneously. Network 100 further comprises four interswitch links 111, 112, 113, and 114. Endpoints A and B are connected to packet switch 101, endpoint C is connected to packet switch 102, and endpoint D is connected to packet switch 103.

Figure 1B:
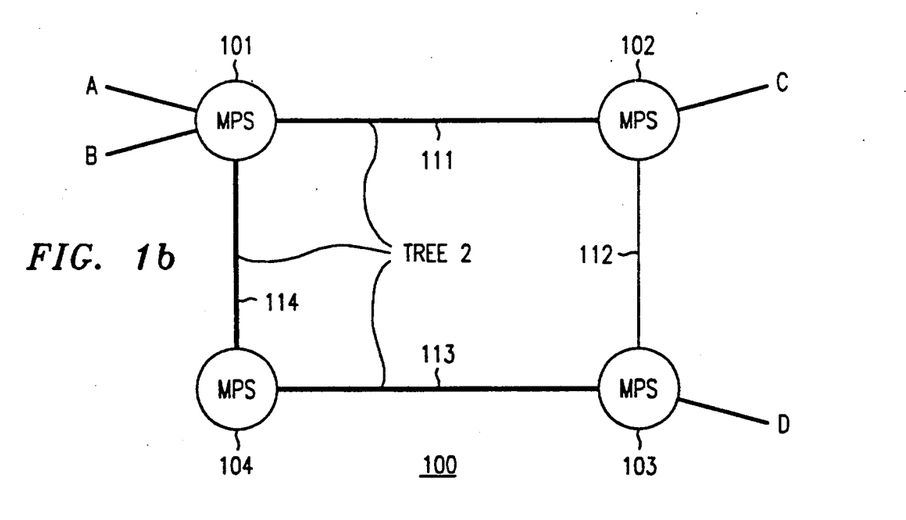
Figure 1C:
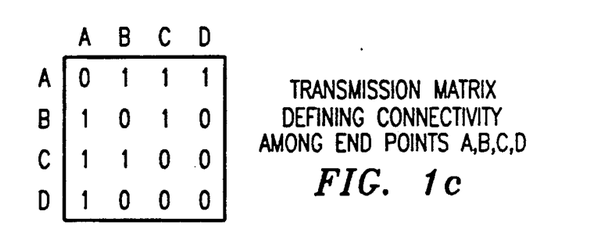

During the initialization of network 100, routing tables are stored in each of the packet switches 101, 102, 103, 104. The routing table stored in switch 101 defines a number of trees in network 100, for example, trees 1 and 2 illustrated in FIGS. 1a and FIG. 1b, respectively. Each of the packet switches 101, 102, 103 and 104 individually meets at least a weak packet sequencing condition which guarantees point-to-point sequential packet transfer from each switch input port to any of the switch output ports.

For the present example, assume that a user at endpoint A wishes to establish a multicast connection among endpoints A, B, C, and D in accordance with the transmission matrix of FIG. 1c. The transmission matrix defines the connectivity among endpoints A, B, C and D as follows: packets from A are to be broadcast to B, C, and D; packets from B are to be multicast to A and C only; packets from C are to be multicast to A and B only; and packets from D are to be transmitted to A only. Also assume that the multicast connection is required to meet at least a weak sequencing condition which guarantees point-to-point sequential packet transfer among the endpoints A, B, C, and D. If a multidestination error control procedure is in place such that reliable packet transfer from any endpoint to each of its receiving endpoints is guaranteed, the multicast connection is referred to as a multicast virtual circuit.

Each multicast connection which is established in network 100 uses at most one logical channel number of any inter-switch link for that connection since no duplicate packets are transmitted between any two switches. In general, however, different logical channel numbers may be used on different inter-switch links emanating from a single switch. The logical channel numbers are used by the packet switches to route packets after a connection has been established. The logical channel numbers of a given connection are stored in a translation tables in each of the packets switches as part of the process of establishing a connection.

In response to a connection request packet from endpoint A, switch 101 reads its routing table and determines, based on the requested destination endpoints B, C, and D, that tree 1 (FIG. 1a) may be usable for the requested communication. In tree 1, the set of packet switches 101, 102, 103 and the set of inter-switch links 111 and 112 would be used for the communication. In accordance with the exemplary method of the invention, switch 101 performs a check concerning link 111 emanating therefrom to determine whether link 111 would be required to transmit packets from different sending endpoints to other than identical receiving endpoints. In the present example, switch 101 determines that packets from endpoint A are to be transmitted to endpoints C and D while packets from endpoint B are to be transmitted to endpoint C only. This is not possible since only one logical channel number may be used on link 111 for the connection. Accordingly, switch 101 determines that the multicast connection based on tree 1 would not be usable to effect communication among the set of endpoints A, B, C, and D in accordance with the transmission matrix of FIG. 1c and meeting the weak packet sequencing condition. In the present example, switch 101 again reads its routing table and determines that tree 2 (FIG. 1b) may also be usable for the communication. Switch 101 performs checks concerning links 111 and 114 emanating therefrom and finds that neither of those links would be required to transmit packets from different sending endpoints to other than identical receiving endpoints. Switch 101 selects the logical channel number to be used on link 111 and the logical channel number to be used on link 114 and stores those numbers in its translation table for use in routing packets once the connection has been established. Switch 101 then transmits connection request packets to switches 102 and 104. Switch 102 has no inter-switch links of tree 2 that need to be checked since the endpoint C is connected directly to switch 102. Switch 104 performs a check concerning link 113 and finds that link 113 would not be required to transmit packets from different sending endpoints to other than identical receiving endpoints. Switch 104 selects the logical channel number to be used on link 113, stores that number in its translation table, and transmits a connection request packet to switch 103. To complete the establishment of the multicast connection, switches 102 and 103 store information to associate the packets of the connection on link 111 with endpoint C, and on link 113 with endpoint D.

Figure 2A:
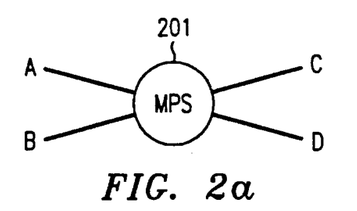
FIG. 2a-FIG. 2f are diagrams used in describing an exemplary method of the invention when a strong packet sequencing condition is required.
Figure 2B:
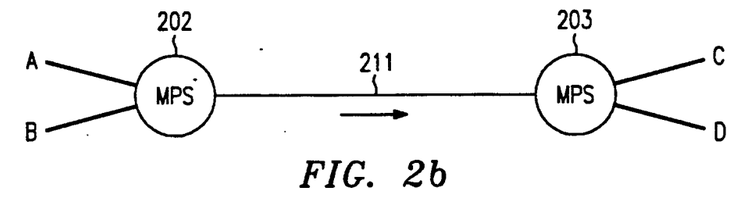
Figure 2C:
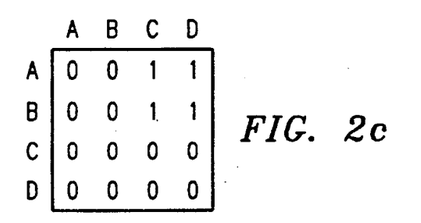

FIG. 2a, FIG. 2b, FIG. 2d, and FIG. 2e are diagrams of arrangements used to illustrate the exemplary connection method in accordance with the invention, when the requested multicast connection must meet a strong packet sequencing condition. The strong condition guarantees that those endpoints receiving packets from at least two common sending endpoints will receive identical interleaved packet streams with respect to the packet streams from the common sending endpoints. This condition may be required, for example, when two databases are being concurrently updated from a plurality of sources. In FIG. 2a, a single multicast packet switch 201 is used to establish a multicast connection for communication among endpoints A, B, C, and D in accordance with the transmission matrix of FIG. 2c: A transmits packets to C and D, and B transmits packets to C and D. Switch 201 individually meets the weak packet sequencing condition but does not meet the strong condition. Therefore, it is clear that a multicast connection through switch 201 alone would not be usable to effect communication among endpoints A, B, C, and D in accordance with the transmission matrix of FIG. 2c and meeting the strong packet sequencing condition. However, consider the arrangement of FIG. 2b, where two packet switches 202 and 203 are connected by a single inter-switch link 211. Again each of the packet switches 202 and 203 individually meets the weak packet sequencing condition but does not meet the strong condition. A check is performed to determine whether there are at least two endpoints receiving packets from at least two common sending endpoints that do not do so via a common link. The check determines that endpoints C and D receive packets from common sending endpoints A and B via the common link 211. Accordingly, a multicast connection through switches 202 and 203 would be usable to effect communication among endpoints A, B, C, and D in accordance with the transmission matrix of FIG. 2c and meeting the strong packet sequencing condition.

Figure 2D:
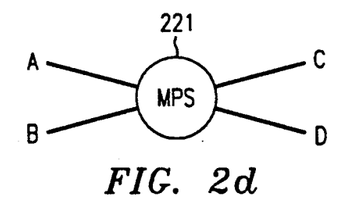
Figure 2E:
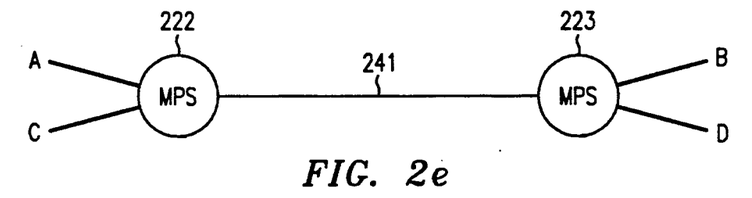
Figure 2F:
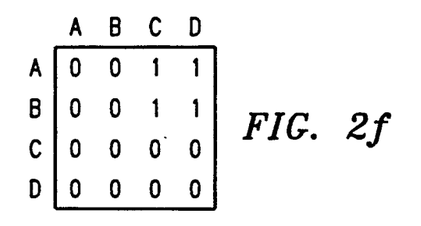

Next consider the arrangement of FIG. 2d and FIG. 2e, where each of the packet switches 221, 222, and 223, individually meets the strong packet sequencing condition. It is clear that a multicast connection through switch 221 alone would be usable to effect communication among endpoints A, B, C, and D in accordance with the transmission matrix of FIG. 2f and meeting the strong packet sequencing condition. Consider the arrangement of FIG. 2e, where two packet switches 222 and 223 are connected by a single inter-switch link 241. A check is performed to determine whether there is at least one link for which there exists a sending endpoint and a receiving endpoint upstream from that link, and a sending endpoint and a receiving endpoint downstream from that link, where the upstream and downstream receiving endpoints have the upstream and downstream sending endpoints as common multicasting sources. In this case, sending endpoint A and receiving endpoint C are upstream from link 241, sending endpoint B and receiving endpoint D are downstream from link 241, and receiving endpoints C and D having sending endpoints A and B as common multicasting sources. Endpoints C and D receive packets from common sending endpoints A and B do not do so via a common link. C receives packets from B via link 241, and D receives packets from A via link 241; however, C does not receive packets from A via link 241 and D does not receive packets from B via link 241. It cannot be guaranteed that C and D will receive identical interleaved packet streams. It is particularly likely that they will not if switches 222 and 223 are separated by a substantial distance. Therefore, a multicast connection through switches 222 and 223 would not be usable to effect communication among endpoints A, B, C, and D in accordance with the transmission matrix of FIG. 2f and meeting the strong packet sequencing condition.

Figure 13:
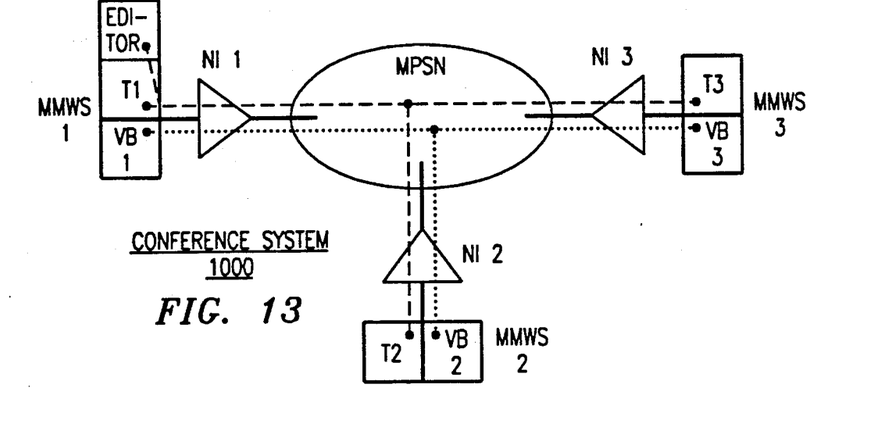

FIG. 13 is a diagram of multimedia conferencing system 1000 comprising a multicast packet switching network MPSN for communication among a plurality of communication endpoints MMWS1, MMWS2, and MMWS3. A multipoint-to-multipoint multicast connection is established among the endpoints MMWS1, MMWS2, and MMWS 3. The multicast connection comprises a plurality of virtual channels, one for signalling, one for voice, and one for data. The desired connectivity for the data virtual channel is point-to-multipoint with upstream capability rather than multipoint-to-multipoint. Endpoints MMWS2 and MMWS3, via either hardware or software means, discard packets received in the data virtual channel to effect the desired connectivity.

MULTICAST CONNECTIONS

Figure 3:
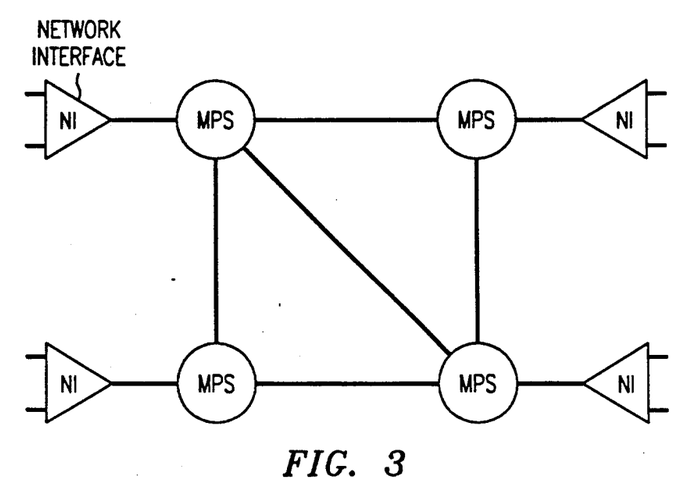
FIG. 3 is a diagram of a multicast packet switching network.

FIG. 3 shows a multicast packet switching network which consists of multicast packet switches (MPSs) and network interfaces (NIs).

To achieve high-speed transmission, the multicast packet switching network is based on fast packet technology (described in J. J. Degan et al., "Fast Packet Technology for Future Switches", *AT&T Technical Journal*, Vol. 68, No. 2, p. 36–50, 1989), having the following attributes: (a) Link-by-link error and flow control is eliminated. Thus, the required field in the data link header is for the logical channel number (LCN), which is used for routing packets through the multicast packet switching network. An LCN for each link within a connection is decided at connection setup time; (b) Edge-to-edge error control can be incorporated within the multicast packet switching network on a per-connection basis; and (c) The multicast packet switching network provides internal connection-oriented services that support high-bandwidth applications very efficiently. In such networks, the required link bandwidth and the end-to-end delay for a multicast application are independent of the number of users. Also, the network performance will not degrade as the number of users increases. These advantages provide a solid foundation for the multicast packet switching network as a vehicle for supporting various multicast applications, especially, interactive multimedia multi-party conferencing.

Figure 4:
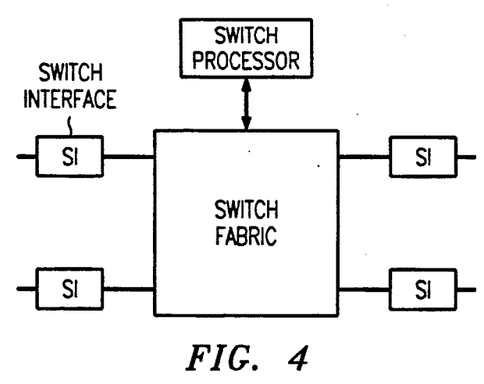
FIG. 4 is a diagram of an individual multicast packet switch in the network of FIG. 3.

A multicast packet switch is composed of a switch fabric, a switch processor, and switch interfaces (SIs), as shown in FIG. 4. The switch fabric is capable of duplicating an incoming packet and routing the copies to desired outgoing ports. An exemplary multicast packet switch is disclosed in the U.S. patent application of K. T. Teraslinna et al., Ser. No. 07/412,952, assigned to the assignee of the present invention.

Figure 5:
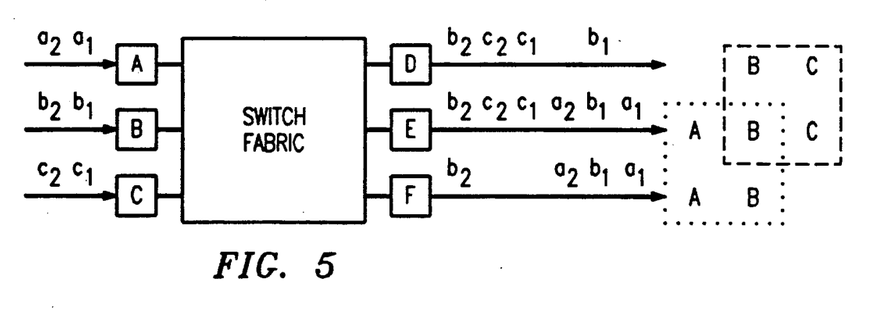
FIG. 5 is a diagram illustrating a strong packet sequencing condition.

[Definition 2.1]: With multiple input streams each destined to multiple outputs, a switch fabric is said to have a. the weak sequencing (WS) property, if it only guarantees point-to-point sequential transfer from each input port to any of its output ports; or b. the strong sequencing (SS) property, if those output ports receiving two or more common inputs have identical interleaved packet streams with respect to the packet streams from the common input ports. For example, in FIG. 5, the two subsequences of outgoing packet streams at switch interfaces D and E (or switch interfaces E and F) containing $\{b_i\}$ and $\{c_i\}$ (or $\{a_i\}$ and $\{b_i\}$) are identical.

A multicast packet switch will be represented as w-MPS (or s-MPS) if its switch fabric has the weak sequencing (or strong sequencing) property.

In general, different links within a multicast connection may use different LCNs. Thus, each switch interface maintains a packet translation table (PTT) and a multicast control table (MCT) to store routing information about those multicast connections. Each entry of a packet translation table, indexed by an incoming LCN, contains a multicast connection number (MCN) and a switch header. On the incoming link, the MCN field stores the MCN assigned to a multicast connection during connection setup. The switch header identifies a set of outgoing links involved in a multicast connection, which is used for packet duplication and routing through a switch fabric. Each entry of the multicast control table, indexed by a MCN, contains the LCN chosen for the outgoing link within a multicast connection.

Figure 6:
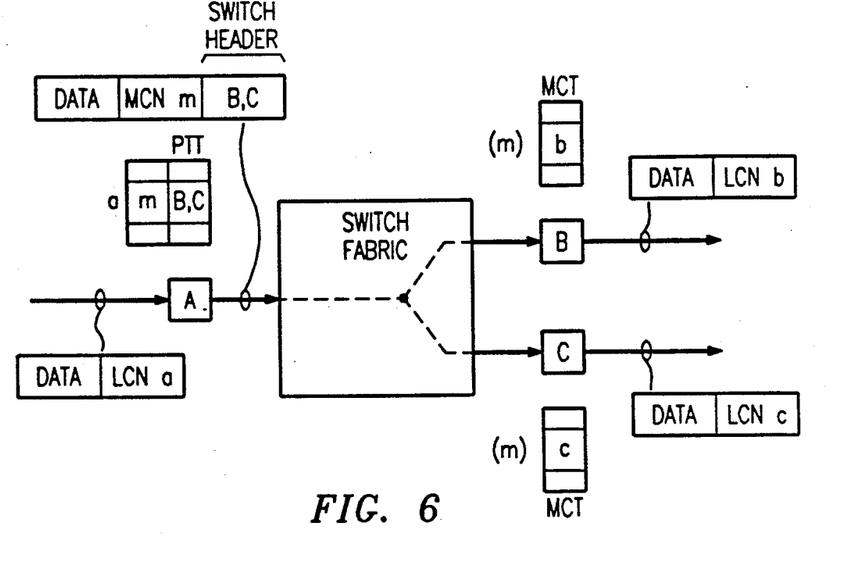
FIG. 6 is a diagram illustrating the packet switching process for a multicast connection through a multicast packet switch.

FIG. 6 illustrates the data packet switching process through a multicast packet switch for a multicast connection. An incoming packet accesses the packet translation table by LCN a at switch interface A. Switch interface A then replaces LCN a in the packet header by the stored MCN m and prepends the stored switch header to the packet for packet duplication and routing. Each outgoing packet uses MCN m in its header to access the multicast control table at the outgoing switch interface and obtains an outgoing LCN. Switch interface B and switch interface C then replace MCN m in the packet header by LCN b and LCN c, respectively. Finally, the switch header of each outgoing packet will be stripped off at the outgoing switch interface before it leaves.

[Lemma 1]: Any arbitrary data packet flow pattern (DPFP) within a multicast packet switch can be achieved.

<Proof>: Given a set of switch interfaces, with an LCN chosen for each switch interface, it is clear that the direction of data packet flow among these switch interfaces can be controlled by writing suitable information into their packet translation tables and multicast control tables.

Figure 7A:
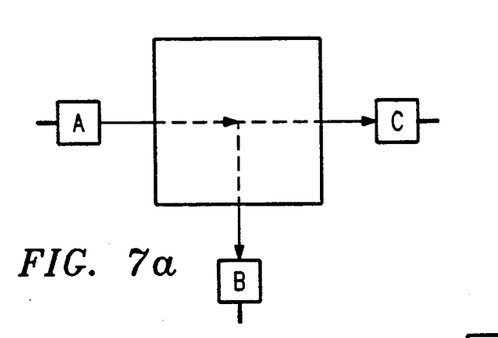
FIG. 7a-FIG. 7c illustrate three data packet flow patterns within a multicast packet switch.
Figure 7B:
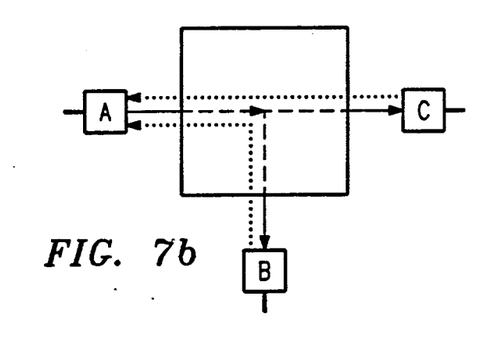
Figure 7C:
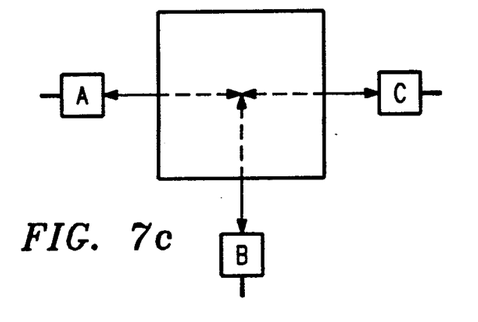

FIG. 7 illustrates three natural data packet flow patterns within a multicast packet switch: (a) point-to-multipoint, (b) point-to-multipoint with upstream capability, and (c) multipoint-to-multipoint. They will be referred to as pattern-1, pattern-2 and pattern-3 data packet flow patterns, respectively.

The switch processor (FIG. 4) establishes and disconnects switched multicast connections across the multicast packet switching network.

A network interface (FIG. 3) provides an acess point to the multicast packet switching network for various networks and equipments, e.g., user stations, connected to it. It is responsible for protocol/speed conversion, packet assembly/disassembly, signaling, etc. It also provides an edge-to-edge flow/error control across the multicast packet switching network on a per-connection basis.

A source-based multicast routing method is used to perform multicast connection setup. This method can be applied to both switched multicast connection setup and multicast connectionless packet routing.

For each multicast packet switch in the multicast packet switching network, several spanning trees rooted at this multicast packet switch are generated. A unique global tree number (TN) will be assigned for each tree. Based on these trees, multicast routing tables (MRTs) are established at each multicast packet switch during network initialization. The size of the multicast routing tables depends on the number of multicast packet switches in the multicast packet switching network and the number of trees. Therefore, a tradeoff between the number of trees and memory space required at each multicast packet switch is made. These tables may be updated dynamically. However, it should be done infrequently. The advantage of using multiple spanning trees is to provide alternate multicast routes such that the connection completion rate can be improved. Under normal situations, the connection control packets for establishing or disconnecting a connection progress forward from the source multicast packet switch to the next destination multicast packet switches. They may need to crankback to the source multicast packet switch for finding alternate spanning trees when some multicast packet switch belonging to the chosen spanning tree rejects the new connection setup for some reason.

The basic connection setup procedure is as follows. When a connection setup packet arrives at the source multicast packet switch, the switch processor chooses a tree number, among a set of tree numbers which correspond to those spanning trees rooted at this multicast packet switch, based on a load sharing method. Based on the destination set in the packet and the multicast routing table indexed by the chosen global tree number, the switch processor checks if the appropriate necessary and sufficient conditions described in detail herein are met to determine whether the multicast connection that would be established would be usable to effect communication in accordance with a specified transmission matrix and meeting a given packet sequencing condition. If the check is positive, the switch processor then partitions the destination set into several subsets; each subset will use a different outgoing link. By putting the chosen tree number in the packet and masking off all other destination addresses in the destination set except those in the corresponding subset, a modified copy of the original connection setup packet is then generated and sent to each desired outgoing link. In addition, the switch processor will choose an available multicast connection number (MCN) and send signal packets to update the translation tables in each involved switch interface. When the modified packet reaches the next multicast packet switch, the switch processor uses the tree number in the packet to index a multicast routing table, does some necessary checking, and then further partitions the destination subset. This procedure repeats until all the destinations are reached.

The concept of multicast connections is a natural extension of that of point-to-point connections. That is, a multicast connection is a logical association among a set of network interfaces over which all packets following the same route, need not carry complete destination addresses and arrive in sequence. Based on different requirements, four flavors of multicast connections are defined over an arbitrary multicast packet switching network: vanilla multicast connections (VMCs), multicast virtual circuits (MVCs), strong multicast connections (SMCs) and strong multicast virtual circuits (SMVCs). Roughly speaking, vanilla multicast connections and strong multicast connections only provide network-layer connection-oriented services to the users, and packet loss is allowed. They depend on the users' transport layer to execute error control, if necessary. On the other hand, multicast virtual circuits and strong multicast virtual circuits provide network-layer virtual circuit services to the users, which ensure reliable packet transfer. Therefore, error control in the transport layer is not necessary.

Four flavors of multicast connections are defined on acyclic subgraphs of the graph representing a multicast packet switching network. Acyclic subgraphs guarantee that each multicast connection contains no loop and every packet will reach its destination(s) in finite time and low delay.

[Definition 3.1]:

a. An arbitrary multicast packet switching network is represented by a graph $G=\{S,E,L\}$, where S is the set of all multicast packet switches, E is the set of all network interfaces, and L is the set of all links.
b. $\overline{G}=\{\overline{S}, \overline{E}, \overline{L}\}$ represents an acyclic subgraph of G, which interconnects all network interfaces in a subset $\overline{E}$ of E via a subset $\overline{S}$ of S and a subset $\overline{L}$ of L. Any link 1 in $\overline{L}$ cuts $\overline{G}$ into two disjoint subgraphs $\overline{G}_{l,u}$ and $\overline{G}_{l,d}$. Let $\overline{E}_{l,u}$ and $\overline{E}_{1,d}$ be two disjoint subsets of $\overline{E}$, which contain those network interfaces in $\overline{G}_{l,u}$ and $\overline{G}_{l,d}$, respectively.
c. Each network interface contains a sender component (SC) and a receiver component (RC) that sends and receives packets, respectively. Let SC i and RC i represent the sender component and the receiver component of network interface i, respectively.

Figure 8A:
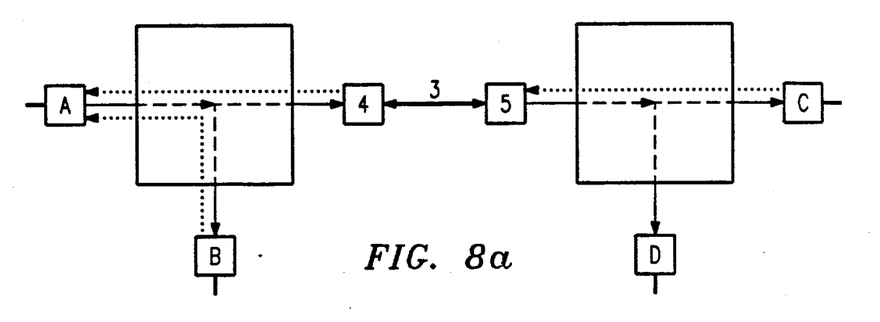
FIG. 8a-FIG. 8d are diagrams used in describing properties of data packet flow patterns.
Figure 8B:
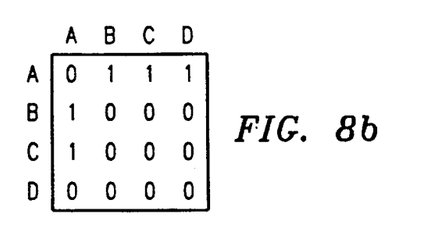
Figure 8C:
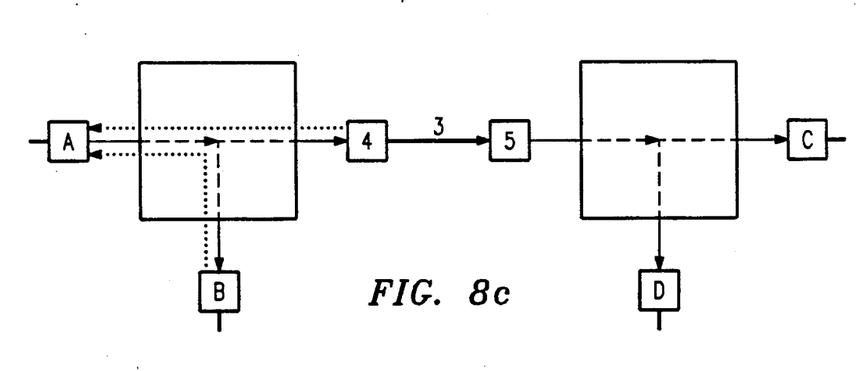
Figure 8D:
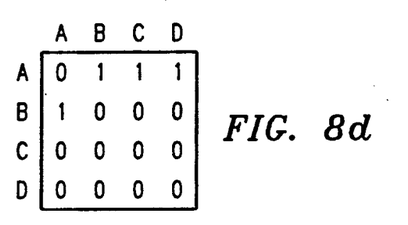

Consider an arbitrary acyclic subgraph $\overline{G}$ of G. According to Lemma 1, with an LCN chosen for each switch interface, any arbitrary data packet flow pattern within each multicast packet switch in $\overline{S}$ can be achieved. Interconnection of these individual data packet flow patterns via the links in $\overline{L}$ constitutes a data packet flow pattern on $\overline{G}$. The flow direction on each link is determined by two individual data packet flow patterns at its ends. With a data packet flow pattern within each multicast packet switches being exemplified, link 3 has a bidirectional flow in FIG. 8(a) and a unidirectional flow in FIG. 8(c). The corresponding transmission matrices are given in FIG. 8(b) and FIG. 8(d).

[Lemma 2]: Given a $\overline{G}$, any data packet flow pattern constructed on $\overline{G}$ has the following properties:
a. Only a single LCN is associated with each link in $\overline{L}$.
b. The data packet flow pattern satisfies the weak sequencing (WS) condition, that is, point-to-point sequential packet transfer from any network interface in $\overline{E}$ to each of its receiving network interface(s) is guaranteed.

<Proof>: (a) is clear since, during the construction of a data packet flow pattern on $\overline{G}$, a common LCN can be chosen for the two switch interfaces at ends of each link in $\overline{L}$. (b) holds since each multicast packet switch has at least the weak sequencing property.

[Definition 3.2]:
a. Given a $\overline{E}$, the sending/receiving relationship among all network interfaces in $\overline{E}$ is represented by a N-by-N transmission matrix: TM($\overline{E}$), where N is the number of network interfaces in $\overline{E}$. TM($\overline{E}$)[i,j] is 1 if RC j receives packets from SC i, and O otherwise.
b. Given two subsets X and Y of $\overline{E}$, the submatrix TM(X,Y) is obtained from TM($\overline{E}$) by retaining only those sender components in X and only those receiver components in Y. Let TM($\overline{E}_{l,u}$, $\overline{E}_{l,d}$) and TM($\overline{E}_{l,d}$, $\overline{E}_{l,u}$) be represented by $TM_{l,u,d}$ and $TM_{l,d,u}$, respectively.

Given a data packet flow pattern on $\overline{G}$, a TM($\overline{E}$) can be easily obtained by tracing data packet flows from each network interface in $\overline{E}$.

By imposing different requirements on data packet flow patterns on $\overline{G}$, four flavors of multicast connections are defined.

[Definition 3.3]: Given a $\overline{G}$, a data packet flow pattern on $\overline{G}$ is a vanilla multicast connection, if it satisfies the multicast condition: There exists at least one network interface in $\overline{E}$ from which the packet stream is destined to two or more network interfaces in $\overline{E}$. These network interfaces are referred to as multicast sources (MSs). The representation VMC($\overline{G}$) will be used to show the relationship between a vanilla multicast connection and its associated $\overline{G}$.

The multicast condition implies that: (1) At least one multicast packet switch in $\overline{S}$ will duplicate packets; and (2) The TM($\overline{E}$), obtained from any VMC($\overline{G}$), has at least one row containing two or more 1's. From this point on, only TM($\overline{E}$)'s having at least one row containing two or more 1's are considered. Given a $\overline{G}$, a TM($\overline{E}$) with the weak sequencing condition may not be satisfied by a VMC($\overline{G}$).

[Theorem 3.1]: Given a $\overline{G}$, TM($\overline{E}$) with the weak sequencing condition can be satisfied by a VMC($\overline{G}$), if and only if it has the following VMC property: For any link 1 in $\overline{L}$, if $TM_{l,u,d}$ (or $TM_{l,d,u}$) contains two or more non-zero rows, these rows must be identical. In other words, every sender component in $\overline{E}_{l,u}$ (or $\overline{E}_{l,d}$) sending packets to the receiver components in $\overline{E}_{l,d}$ (or $\overline{E}_{l,u}$) must have identical destination subsets of $\overline{E}_{l,d}$ (or $\overline{E}_{l,u}$).

Figure 9A:
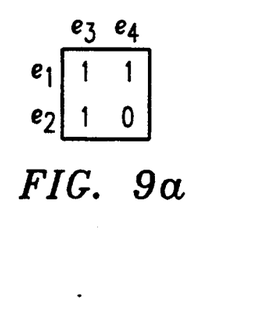
FIG. 9a-FIG. 9c and FIG. 10a-FIG. 10b are diagrams used in describing properties of vanilla multicast connections.
Figure 9B:
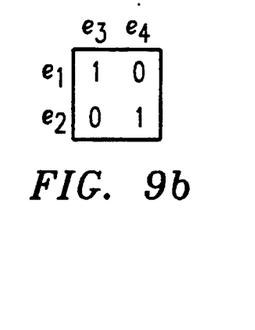
Figures 9C, 10A:
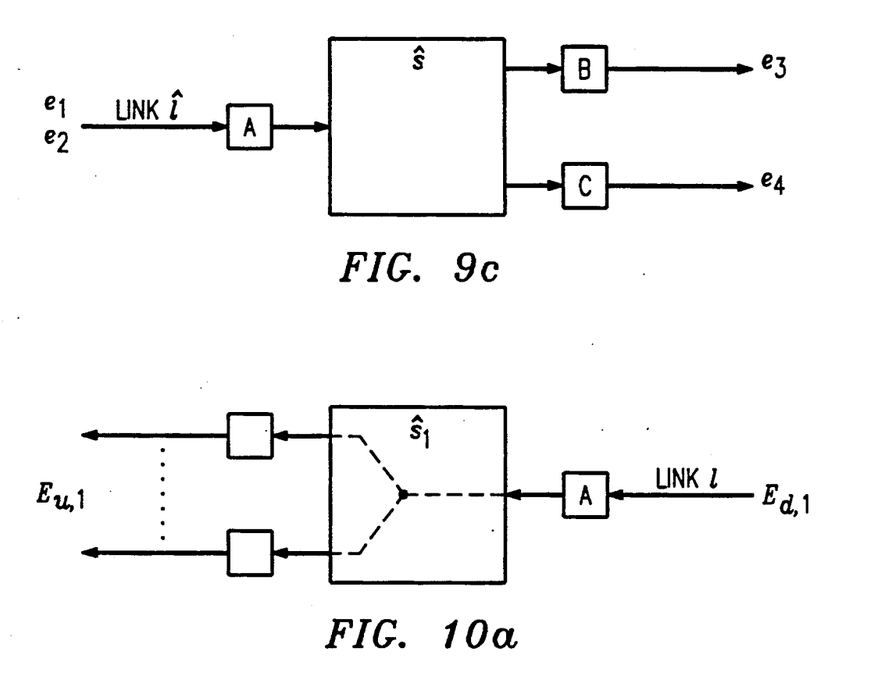

<Proof>: The sufficient condition is shown by contradiction. Assume that there exists a link 1 in $\overline{L}$ so that $TM_{l,u,d}$ contains different non-zero rows. This implies that there exist sender components $e_1$ and $e_2$ in $\overline{E}_{l,u}$ and receiver components $e_3$ and $e_4$ in $\overline{E}_{l,d}$ such that TM($\{e_1, e_2\},\{e_3,e_4\}$) is either FIG. 9(a) or (b). In FIG. 9(a), SC $e_1$ sends packets to both receiver component, $e_3$ and $e_4$, and SC $e_2$ only to RC $e_3$. In FIG. 9(b), SC $e_1$ only sends packets to RC $e_3$, and SC $e_2$ only to RC $e_4$. Since $\overline{G}$ is an acyclic graph, there exists a MPSs in $\overline{G}_{l,d}$ so that packet flows from SCs $e_1$ and $e_2$ will enter its switch interface A via link $\hat{1}$, as shown in FIG. 9(c), and packet flows destined to RCs $e_3$ and $e_4$ will leave from switch interfaces B and C, respectively.

With a single LCN associated with link $\hat{1}$, packets from SCs $e_1$ and $e_2$ will have the same LCN in their headers when they are sent over link $\hat{1}$. Since one LCN only indexes one entry in the packet translation table of switch interface A, packets with the same LCN cannot be duplicated and routed to different subsets of outgoing switch interfaces. Therefore, the desired data packet flow pattern within MPSs to support the submatrices in FIG. 9(a)-(b), can not be achieved. This implies that the TM($\overline{E}$) can not be implemented by any VMC($\overline{G}$). The above conclusion is also true when $TM_{l,d,u}$ contains different non-zero rows.

Figure 10B:
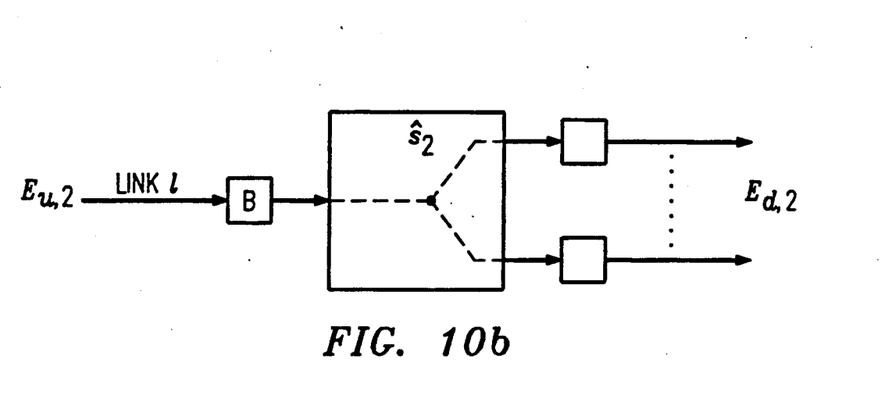

Next the necessary condition is proved. Let $E_{u,1}$ and $E_{u,2}$ (or $E_{d,1}$ and $E_{d,2}$) be two subsets of $\overline{E}_{l,u}$ (or $\overline{E}_{l,d}$), so that TM($E_{d,1}$, $E_{u,1}$) (or TM($E_{u,2}$, $E_{d,2}$)) contains all the 1's in $TM_{l,d,u}$ (or $TM_{l,u,d}$). The corresponding packet flow models of TM($E_{d,1}$, $E_{u,1}$) and TM($E_{u,2}$, $E_{d,2}$) are shown in FIG. 10, in which MPSs $\hat{s}_1$ and $\hat{s}_2$ both have pattern-1 data packet flow patterns. Let LCN n be chosen for link 1, then packets from each sender component in $E_{u,2}$ and $E_{d,1}$ will use LCN n when they are sent over link 1. To achieve these two data packet flow patterns, let the routing field in the switch header entry of the packet translation table at switch interface A (or SI B, resp.), indexed by LCN n, identify a set of outgoing links from which packets are transmitted to the receiver component in $E_{u,1}$ (or $E_{d,2}$).

Three natural vanilla multicast connections over the multicast packet switching network are given below.
a. Point-to-multipoint (Pattern-1): There is only one multicast source and each multicast packet switch in the vanilla multicast connection has pattern-1 data packet flow pattern.
b. Point-to-multipoint with upstream capability (Pattern-2): There is only one multicase source and each multicast packet switch in the vanilla multicast connection has pattern-2 data packet flow pattern.

c. Multipoint-to-multipoint (Pattern-3): In this vanilla multicast connection, each network interface is a multicast source and each multicast packet switch has pattern-3 data packet flow pattern.

Most data applications require reliable communication. To provide a network-based edge-to-edge reliable service to those multicast applications that require completely error-free transmission and that do not employ some higher-layer error control protocol, the multicast virtual circuit is introduced.

[Definition 3.4]: A multicast virtual circuit is a vanilla multicast connection which also satisfies the reliable condition: Point-to-point reliable packet transfer from any network interface to each of its receiving network interfaces is guaranteed.

There are two issues associated with a multicast virtual circuit.

1. Since a vanilla multicast connection may have multiple senders, a multipoint-to-multipoint error control protocol must be exercised among all network interfaces.
2. Given a $TM(\bar{E})$ with the vanilla multicast connection properties, a $VMC(\bar{G})$ can be set up to meet the desired information flow relationship among users. However, this $VMC(\bar{G})$ is only concerned with transmission of data (or information) packets, and there may not exist paths in it for returning acknowledgements (ACKs).

One approach to address the second issue is described below. If the $VMC(\bar{G})$ of a given $TM(\bar{E})$ also provides paths for returning acknowledgements, it will be used to transmit both data and acknowledgements. Otherwise, a $TM'(\bar{E})$ is obtained, where $TM'(\bar{E})[i,j]$ is 1 if $TM(\bar{E})[i,j]$ or $TM(\bar{E})[j,i]$ is 1. If the $TM'(\bar{E})$ still has the vanilla multicast connection properties, a new $VMC(\bar{G})$ is then set up to support the desired information flow relationship represented by the $TM(\bar{E})$ and provide necessary acknowledgement paths. In both cases, some network interfaces may receive undesired data packets and/or acknowledgements. Therefore, two address fields-the addresses of the sending network interface and the receiving network interface-are reserved in the error control header so that each network interface can discard undesired incoming packets. The second field is used only by the acknowledgements.

A vanilla multicast connection and a multicast virtual circuit are not concerned with the sequencing relationship across multiple senders. Although most multicast applications can be supported by a vanilla multicast connection or a multicast virtual circuit, some multicast applications may request the multicast packet switching network to provide a multicast service which maintains the sequencing relationship across multiple senders. A strong multicast connection and a strong multicast virtual circuit are introduced to provide a network-based strong sequencing mechanism to those multicast applications that require strong sequential transmission and that do not employ some higher-layer strong sequencing protocol.

[Definition 3.5]: A vanilla multicast connection is a strong multicast connection, if it also satisfies the strong sequencing (SS) condition: the sequence of packet streams arriving at a set of network interfaces with two or more common multicast sources are identical with respect to the input streams from common multicast sources.

To investigate the relationship between transmission matrices with the strong sequencing condition and strong multicast connections, consider those transmission matrices which have the vanilla multicast connection properties stated in Theorem 3.1 and can be implemented by a vanilla multicast connection.

[Definition 3.6]:
a. Given a matrix, its two columns (or two rows) $\alpha$ and $\beta$ are said to be coupled, if column (or row) $\alpha$ contains at least two 1's at the same row (or column) position as column (or row) $\beta$.
b. A matrix with at least two coupled columns is said to have the strong coupling property, if its columns (or rows) can not be partitioned into two disjoint subsets such that there exists one column (or row) in each subset and these two columns (or rows) are coupled.
c. A $TM(\bar{E})$ having the vanilla multicast connection property and at least two coupled columns is called a coupled transmission matrix and represented as $CTM(\bar{E})$.

It is clear that for each non-$CTM(\bar{E})$ with the vanilla multicast connection property, its associated $VMC(\bar{G})$ is a $SMC(\bar{G})$. From this point on, consider only $CTM(\bar{E})$s. The problem is summarized below.

[Problem 3.1]: Given a $CTM(\bar{E})$, find the sufficient and necessary condition such that its associated $VMC(\bar{G})$ is also a $SMC(\bar{G})$.

Based on Definition 3.5, the strategy to solve Problem 3.1 is to find out all those subsets of receiver components which have respective two or more common sender components and then check the strong sequencing condition for each subset separately. By using the following partition method, a $CTM(\bar{E})$ can be partitioned into a number of submatrices which have either no coupling property or the strong coupling property. Each submatrix corresponds to a partial packet flow of the associated $VMC(\bar{G})$.

[$CTM(\bar{E})$ Partition Method]: Let C be initialized to include all the columns of the $CTM(\bar{E})$. The disjoint subsets $\{C_j, j=0, \ldots, m(>=1)\}$ of C can be generated from the following steps as C shrinks to an empty set.

Assume that the subsets $C_1, \ldots, C_{j-1}$ are already non-empty and the subset $C_j$ is empty.

Step 1:
If C contains only one column, then move the remaining column from C to $C_o$. In any case, stop if C is empty. Otherwise go to Step 2.

Step 2:
Find a column with the largest number of 1's, say $\hat{c}$, from C. Move $\hat{c}$ from C to $C_j$.

Step 3:
For each column c in C, repeat the following procedure:
{If there exists a column in $C_j$ so that these two columns have the coupling property, then move c from C to $C_j$.}

Step 4:
If $C_j$ contains only $\hat{c}$, then move $\hat{c}$ from $C_j$ to $C_o$. Go back to Step 1.

Let $\bar{E}_{r,j}$ be the set of receiver components corresponding to those columns in $C_j$. Clearly, $\bar{E}_{r,o}, \ldots, \bar{E}_{r,m}$ are disjoint.

By using similar steps as those above, the rows of each submatrix $TM(\bar{E}, \bar{E}_{r,j})$, $1 \leq j \leq m$, can be partitioned into a number of disjoint subsets $\{R_i, i=0, \ldots, n (\geq 1)\}$. Let $\bar{E}_{s,i}$ represent the set of sender components corresponding to the rows in $R_i$ and $TM_{i,j}$ represent the submatrix $TM(\bar{E}_{s,i}, \bar{E}_{r,j})$. Clearly, $\bar{E}_{s,o}, \ldots, \bar{E}_{s,n}$ are disjoint.

$C_o$ and $R_o$ may be empty; however, $C_1$ and $R_1$ always exist by the definition of CTM($\bar{E}$). Based on Definition 3.5, it is clear that the strong sequencing condition of the CTM($\bar{E}$) is satisfied, if and only if the strong sequencing condition of each submatrix obtained in the partition algorithm is satisfied. Since TM($\bar{E}, \bar{E}_{r,o}$) and TM$_{o,j}$, $1 \leq j \leq m$, if they exist, do not have the coupling property, the packet flows corresponding to these submatrices are ignored while the strong sequencing condition of the CTM($\bar{E}$) is checked. However, each TM$_{i,j}$, $1 \leq i \leq n$, $1 \leq j \leq m$, has the strong coupling property. Therefore, to deal with Problem 3.1, consider these TM$_{i,j}$, $1 \leq i \leq n$, $1 \leq j \leq m$, and deal with their strong sequencing conditions separately. Note that each TM$_{i,j}$ has the vanilla multicast connection property since the CTM($\bar{E}$) does. Depending on the type of multicast packet switches, the sufficient and necessary condition that the strong sequencing condition of a TM$_{i,j}$ can be satisfied will be different. The following definition is needed for describing the main results which are summarized in Theorem 3.2 and Theorem 3.3.

[Definition 3.7]: Any link 1 in $\bar{L}$ cuts $\bar{G}$ into two disjoint subgraphs $\bar{G}_{1,u}$ and $\bar{G}_{l,d}$. Let $\bar{E}_{s,i,l,u}$ and $\bar{E}_{s,i,l,d}$ contain those sender components in $\bar{G}_{l,u}$ and $\bar{G}_{l,d}$, respectively. Also, let $\bar{E}_{r,j,l,u}$ and $\bar{E}_{r,j,l,d}$ contain those receiver components in $\bar{G}_{l,u}$ and $\bar{G}_{l,d}$, respectively.

[Theorem 3.2]: Assume all the multicast packet switches are w-MPSs. For any given TM$_{i,j}$, $1 \leq i \leq n$, $1 \leq j \leq m$, its strong sequencing condition can be satisfied, if and only if, there exists an inter-MPS link in $\bar{L}$ such that if all the sender components in $\bar{E}_{s,i}$ are in $\bar{G}_{l,u}$ (or $\bar{G}_{l,d}$), then all the receiver components in $\bar{E}_{r,j}$ must be in $\bar{G}_{l,d}$ (or $\bar{G}_{l,u}$).

<Proof>: Since w-MPSs only have the weak sequencing property, it is clear that the strong sequencing condition among the receiver components in $\bar{E}_{r,j}$ can be satisfied if and only if these receiver components receive packets via a single link, where all packet streams originating from the sender components in $\bar{E}_{s,i}$ are multiplexed into a single interleaved packet stream. In this case, the value of each element in TM$_{i,j}$ is 1, since TM$_{i,j}$ has the vanilla multicast connection property and the strong coupling property.

[Theorem 3.3]: Assume all the multicast packet switches are s-MPSs. For any given TM$_{i,j}$, $1 \leq i \leq n$, $1 \leq j \leq m$, its strong sequencing condition can be satisfied, if and only if, for any inter-MPS link 1 in $\bar{L}$, there do not exist a sender component and a receiver component in $\bar{G}_{l,u}$ and a sender component and a receiver component in $\bar{G}_{l,d}$ such that these two receiver components have these two sender components as common multicast sources. In other words, there do not exist four respective non-empty subsets, say $\hat{E}_{s,i,l,u}$, $\hat{E}_{s,i,l,d}$, $\hat{E}_{r,j,l,u}$ and $\hat{E}_{r,j,l,d}$, of the sets $E_{s,i,l,u}$, $E_{s,i,l,d}$, $\bar{E}_{r,j,l,u}$ and $\bar{E}_{r,j,l,d}$, such that the value of each element in TM($\{\hat{E}_{s,i,l,u}, \hat{E}_{s,i,l,d}\}, \{\hat{E}_{r,j,l,u}, \hat{E}_{r,j,l,d}\}$) is 1.

Figure 11A:
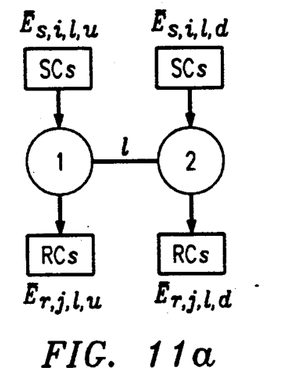
FIG. 11a-FIG. 11c are diagrams used in describing properties of strong multicast connections.

<Proof>: When the sender components in $\bar{E}_{s,i}$ and the receiver components in $\bar{E}_{r,j}$ are connected to the same multicast packet switch, the claim is true since the s-MPS has the strong sequencing property. Therefore, it suffices to prove the case when the sender components in $\bar{E}_{s,i}$ and the receiver components in $\bar{E}_{r,j}$ are not connected to the same multicast packet switches. Since TM$_{i,j}$ has the vanilla multicast connection properties, FIG. 11(a) depicts an equivalent two-MPS model with respect to each inter-MPS link 1. Multicast packet switches switches 1 and 2 represent the two multicast packet switches which link 1 connects. The sender components in $\bar{E}_{s,i,l,u}$ and the receiver components in $\bar{E}_{r,j,l,u}$ are connected to multicast packet switch 1, and the sender components in $\bar{E}_{s,i,l,d}$ and the receiver components in $\bar{E}_{r,j,l,d}$ are connected to multicast packet switch 2.

Figure 11B:
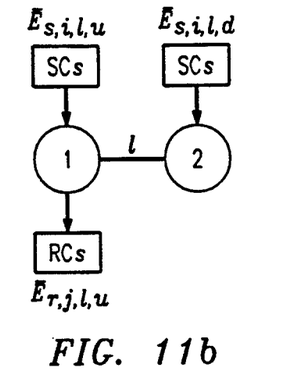

The packet flow model corresponding to TM($\bar{E}_{s,i}, \bar{E}_{r,j,l,u}$) is shown in FIG. 11(b). This is equivalent to the case that the sender components in $\bar{E}_{s,i}$ and the receiver components in $\bar{E}_{r,j,l,u}$ are all connected to multicast packet switch 1, and therefore, the strong sequencing condition among the receiver components in $\bar{E}_{r,j,l,u}$ with respect to the common sender components in $\bar{E}_{s,i}$ is satisfied. Similarly, by removing $\bar{E}_{r,j,l,u}$, $\bar{E}_{s,i,l,d}$ and $\bar{E}_{s,i,l,u}$ from FIG. 11(a), respectively, the strong sequencing condition among the receiver components in $\bar{E}_{r,j,l,d}$ with respect to the common sender components in $\bar{E}_{s,i}$, the strong sequencing condition among the receiver components in $\bar{E}_{r,j}$ with respect to the common sender components in $\bar{E}_{s,i,l,u}$, the strong sequencing condition among the receiver components in $\bar{E}_{r,j}$ with respect to the common sender components in $\bar{E}_{s,i,l,d}$ are also satisfied. Therefore, the only remaining case to check is when there exists at least one element in each of the four sets—$\bar{E}_{s,i,l,u}$, $\bar{E}_{s,i,l,d}$, $\bar{E}_{r,j,l,u}$ and $\bar{E}_{s,i,l,u}$, such that these receiver components have these sender components as common multicast sources.

Figure 11C:
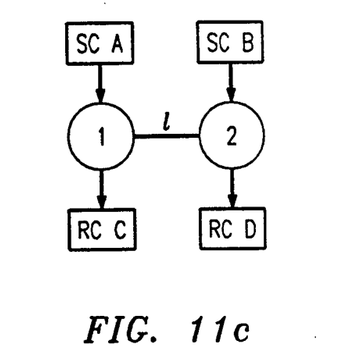

The necessary condition is proved first. For any inter-MPS link 1 in $\bar{L}$, suppose there do not exist a sender component and a receiver component in $\bar{G}_{l,u}$ and a sender component and a receiver component in $\bar{G}_{l,d}$ such that these two receiver components have these two sender components as common multicast sources. This implies that the above remaining case does not exist. Therefore, the strong sequencing condition of the TM$_{i,j}$ is satisfied. Next, the sufficient condition is proved by contradiction. Consider FIG. 11(c), in which sender component A, sender component B, receiver component C and receiver component D are in $\bar{E}_{s,i,l,u}$, $\bar{E}_{s,i,l,d}$, $\bar{E}_{r,j,l,u}$ and $\bar{E}_{r,j,l,d}$, respectively, and sender components A and B are common multicast sources to receiver components C and D. If each of sender components A and B sends a packet to receiver components C and D at the same time, then receiver component C (or receiver component D) will receive the packet from sender component A (or sender component B) first. Therefore, receiver components C and D will not receive identical interleaved packet streams.

[Definition 3.8]: A strong multicast virtual circuit is a strong multicast connection which also satisfies the reliable condition: a set of network interfaces with two or more common multicast sources will receive identical interleaved packet streams with respect to the input streams from common multicast sources.

By executing multidestination error control among all network interfaces in a strong multicast connection, some retransmitted packets may exist. Without other means, each receiver component may put an original packet and a retransmitted packet coming from different multicast sources into different order, and the strong sequencing condition is violated. To solve this problem, each packet in a strong multicast virtual circuit carries a global time stamp. Time-stamp ordering assures that the strong sequencing condition among all the receiver components in a strong multicast virtual circuit is satisfied.

Various flavors of multicast connections provide various kinds of multicast services to users. A multicast application (MA) is an end-user's use for a multicast service or a collection of multicast services. To achieve service integration, a multicast application is viewed by the users as an integrated service.

Figure 12:
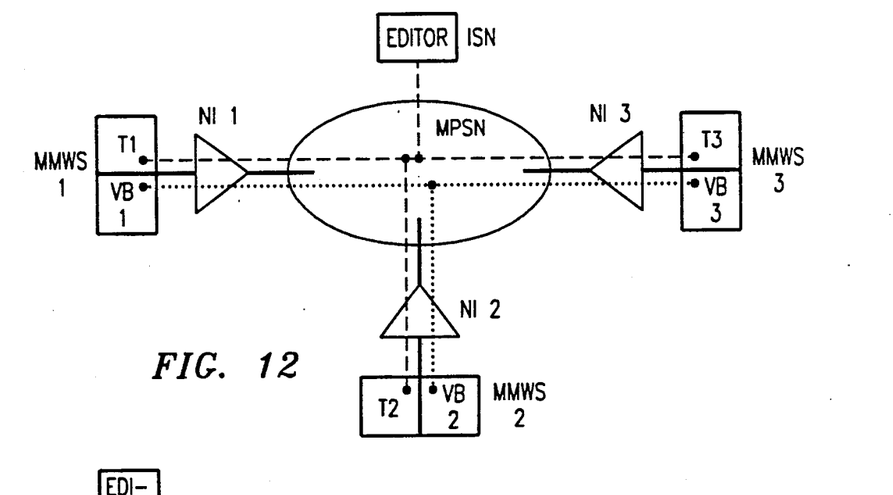
FIG. 12 and FIG. 13 are diagrams of two multimedia conferencing arrangements.

The single-media multicast applications, such as multi-destination file transfer, voice conferencing, etc, are generally supported by a suitable flavor of multicast connection. However, for those multimedia multicast applications (MMAs) involving two or more media, they may or may not be supported by a single multicast connection. Consider a multi-party interactive debugger. Two different scenarios are shown in FIG. 12 and FIG. 13, respectively. Each multimedia workstation (MMWS) contains a terminal (e.g. T1) and a voice bridge (VB) and is connected to a separate network interface. In FIG. 12, the editor program used for file debugging is a network server in an intelligent server node (ISN). Multiple multicast connections are used. The dashed lines interconnecting the editor program and the three terminals represent a pattern-2 multicast virtual circuit with the intelligent server node as the multicast source; the dotted lines interconnecting the three voice bridges represent a pattern-3 vanilla multicast connection. In FIG. 13, the editor program resides in multimedia workstation 1. As before, the users can request multiple multicast connections to support the multimedia multicast applications; or as an alternative, the users may request a single pattern-3 vanilla multicast connection for both data and voice. The latter results in a multimedia multicast connection, in which two media share the same logical channel number and are distinguished by different channel numbers. Its advantage is that the connection setup is done only once. Since the data are also sent via the pattern-3 vanilla multicast connection, multimedia workstation 3 (or multimedia workstation 2) needs to discard those incoming editor-program-destined editor commands generated at multimedia workstation 2 (or multimedia workstation 3). This data-packet-discarding is efficiently implemented in hardware. Multidestination error control for reliable data is executed at the multimedia workstations rather than the network interfaces. The voice sharing the same multicast connection with the other media shows an advantage of using distributed voice bridges.

In summary, the number of multicast connections needed to support a given multimedia multicast application generally depends on the location of servers and their relationships. For the local servers, such as the editor program and the voice bridges in FIG. 13, residing in the multimedia workstations, a single multicast connection or multiple multicast connections can be requested to support the communication among them. For the network servers, residing in the network interfaces or the intelligent server nodes, their locations are generally transparent to the users. Therefore, the users may need to request a separate multicast connection for each independent network-based service.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A method for use in an arrangement comprising a multicast packet switching network for communication among a plurality of communication endpoints, said communication comprising transmission of packets, said network comprising a plurality of packet switches interconnected by a plurality of inter-switch links, each of said endpoints connected to one of said packet switches, said method comprising prior to transmitting said packets, determining a set of said packet switches and a set of said inter-switch links to comprise a multicast connection through said network for communication among a set comprising at least three of said endpoints, checking whether said multicast connection would be usable to effect communication among said set of endpoints in accordance with a specified transmission matrix and meeting a packet sequencing condition; and establishing said multicast connection only when said checking indicates that said multicast connection would be usable to effect communication among said set of endpoints in accordance with said specified transmission matrix and meeting said packet sequencing condition.

2. A method in accordance with claim 1 wherein each of said set of inter-switch links uses at most one logical channel number for said connection.

3. A method in accordance with claim 1 wherein said multicast connection is a multicast virtual circuit.

4. A method in accordance with claim 1 wherein said checking comprises ones of said set of packet switches each performing individual checks.

5. A method in accordance with claim 1 wherein said packet sequencing condition is a weak sequencing condition which guarantees point-to-point sequential packet transfer.

6. A method in accordance with claim 5 wherein said checking comprises determining that said multicast connection would not be usable to effect communication among said set of endpoints in accordance with said specified transmission matrix and meeting said packet sequencing condition when there is at least one of said set of said inter switch links that would be required to transmit packets from different sending ones of said set of endpoints to other than identical receiving ones of said set of endpoints.

7. A method in accordance with claim 1 wherein said packet sequencing condition is a strong sequencing condition which guarantees that those of said set of endpoints receiving packets from at least two common sending ones of said set of endpoints will receive identical interleaved packet streams with respect to the packet streams from the common sending endpoints.

8. A method in accordance with claim 7 wherein each of said plurality of packet switches has input ports and output ports and individually satisfies a weak packet sequencing condition which guarantees point-to-point sequential transfer from each of said input ports to any of said output ports.

9. A method in accordance with claim 8 wherein said checking comprises determining that said multicast connection would not be usable to effect communication among said set of endpoints in accordance with said specified transmission matrix and meeting said strong sequencing condition when there are at least two of said set of endpoints receiving packets from at least two common sending ones of said set of endpoints that do not do so via a common one of said set of links.

10. A method in accordance with claim 7 wherein each of said plurality of packet switches has input ports and output ports and individually satisfies a strong packet sequencing condition which guarantees that those of said output ports receiving packets from at least two common ones of said input ports will receive identical interleaved packet streams with respect to the packet streams from said common input ports.

11. A method in accordance with claim 10 wherein said checking comprises determining that said multicast connection would not be usable to effect communication among said set of endpoints in accordance with said specified transmission matrix and meeting said first-mentioned strong sequencing condition when there is at least one of said set of links for which there exists a sending one of said set of endpoints and a receiving one of said set of endpoints upstream from said at least one link, and a sending one of said set of endpoints and a receiving one of said set of endpoints downstream from said at least one link, where said upstream and downstream receiving endpoints have said upstream and downstream sending endpoints as common multicasting sources.

12. A method for use in an arrangement comprising a multicast packet switching network for communication among a plurality of communication endpoints, said communication comprising transmission of packets, said network comprising a plurality of packet switches interconnected by a plurality of inter-switch links, each of said endpoints connected to one of said packet switches, said method comprising prior to transmitting said packets, determining a set of said packet switches and a set of said inter-switch links to comprise a multicast connection through said network for communication among a set comprising at least three of said endpoints, checking whether said multicast connection would be usable to effect communication among said set of endpoints in accordance with a specified transmission matrix, and establishing said multicast connection only when said checking indicates that said multicast connection would be usable to effect communication among said set of endpoints in accordance with said specified transmission matrix.

13. A method for use in an arrangement comprising a multicast packet switching network for communication among a plurality of communication endpoints, said communication comprising transmission of packets, said network comprising a plurality of packet switches interconnected by a plurality of inter-switch links, each of said endpoints connected to one of said packet switches, said method comprising prior to transmitting said packets, determining a set of said packet switches and a set of said inter-switch links to comprise a multicast connection through said network for communication among a set comprising at least three of said endpoints, checking whether said multicast connection would be usable to effect communication among said set of endpoints meeting a packet sequencing condition, and establishing said multicast connection only when said checking indicates that said multicast connection would be usable to effect communication among said set of endpoints meeting said packet sequencing condition.

* * * * *